United States Patent
Gowda

(10) Patent No.: US 10,803,684 B2
(45) Date of Patent: Oct. 13, 2020

(54) AIRCRAFT SYSTEMS AND METHODS FOR RETROSPECTIVE PILOT INPUT ANALYSIS

(71) Applicant: HONEYWELL INTERNATIONAL INC., Morris Plains, NJ (US)

(72) Inventor: Sushma Gowda, Bangalore (IN)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 0 days.

(21) Appl. No.: 16/176,951

(22) Filed: Oct. 31, 2018

(65) Prior Publication Data

US 2020/0134940 A1  Apr. 30, 2020

(51) Int. Cl.
| | |
|---|---|
| *G07C 5/08* | (2006.01) |
| *G06F 3/0482* | (2013.01) |
| *G06F 3/0481* | (2013.01) |
| *G06F 3/0488* | (2013.01) |

(52) U.S. Cl.
CPC ........... *G07C 5/085* (2013.01); *G06F 3/0482* (2013.01); *G06F 3/0488* (2013.01); *G06F 3/04817* (2013.01)

(58) Field of Classification Search
None
See application file for complete search history.

(56) References Cited

U.S. PATENT DOCUMENTS

| | | | |
|---|---|---|---|
| 6,397,128 B1 | 5/2002 | Todd | |
| 8,929,955 B2 | 1/2015 | Jung et al. | |
| 9,268,478 B2 | 2/2016 | Nutaro et al. | |
| 2008/0077882 A1* | 3/2008 | Kramer | B60K 35/00 715/810 |
| 2016/0202839 A1* | 7/2016 | Hwang | G06F 3/0416 345/174 |

FOREIGN PATENT DOCUMENTS

| | | |
|---|---|---|
| EP | 2657135 A2 | 10/2013 |
| WO | 2016160501 A1 | 10/2016 |

* cited by examiner

*Primary Examiner* — David D Davis
(74) *Attorney, Agent, or Firm* — Lorenz & Kopf, LLP

(57) ABSTRACT

Aircraft systems and methods are provided for capturing user inputs during operation. An aircraft system includes a user interface and a flight data recorder coupled to the user interface. The user interface includes a user input device to receive a user input and a control module coupled to the user input device to capture data associated with the user input and output the data. The flight data recorder receives the data associated with the user input and stores the data associated with the user input device in a time ordered sequence.

19 Claims, 7 Drawing Sheets

AIRCRAFT SYSTEMS AND METHODS FOR RETROSPECTIVE PILOT INPUT ANALYSIS

TECHNICAL FIELD

The subject matter described herein relates generally to vehicle systems, and more particularly, embodiments of the subject matter relate to avionics systems and methods for capturing operator inputs for retrospective analysis.

BACKGROUND

Many aircraft include flight recorders, such as a flight data recorder (FDR) and/or a cockpit voice recorder (CVR). The recorded flight data and cockpit audio provide insight into operation of the aircraft for subsequent investigation and analysis. However, many existing data recorders do not capture all of the potentially available information pertaining to how a pilot was operating the aircraft, what information the pilot may or may not have been aware of, whether or not a pilot has performed required actions, whether or not an onboard system did not respond to a pilot request in an expected manner, etc. Additionally, the voice data captured by CVRs may be susceptible to noise caused by vibration, turbulence, or other factors that degrades its utility.

Accordingly, it is desirable to provide more robust data capturing systems and methods that provide a better understanding of the pilot's actions or behaviors to better facilitate retrospective investigations and improve the accuracy or reliability of the resulting conclusions regarding the pilot's operation of the aircraft. Other desirable features and characteristics of the methods and systems will become apparent from the subsequent detailed description and the appended claims, taken in conjunction with the accompanying drawings and the preceding background.

BRIEF SUMMARY

Systems and related methods for capturing user input data pertaining to operation of a vehicle such as an aircraft are provided. One exemplary embodiment of an aircraft system includes a user interface including a user input device to receive a user input and a control module coupled to the user input device to capture data associated with the user input and output the data, and a flight data recorder coupled to the user interface to receive the data associated with the user input and store the data associated with the user input device in a time ordered sequence.

In another embodiment, a method of capturing user input data pertaining to operation of a vehicle involves a data recording system onboard the vehicle receiving spatial data associated with a user input on a display device, receiving metadata associated with the user input, and maintaining an association between the spatial data and the metadata in a data storage element in a time ordered sequence.

In yet another embodiment, an aircraft system includes a touchscreen interface having a display device, a touch panel to receive a tactile user input, and a control module coupled to the touch panel and the display device to capture data associated with the tactile user input, and a flight data recorder coupled to the touchscreen interface and including a data storage element to store the data associated with the tactile user input received from the touchscreen interface in a time ordered sequence.

Furthermore, other desirable features and characteristics of the subject matter described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein relate to vehicle systems and methods for capturing user input data and storing the user input data in a time ordered sequence for retrospective analysis. In exemplary embodiments, the user input data includes data characterizing the position of a user input received by a touchscreen or similar tactile user interface along with other metadata pertaining to the user input, such as, for example, data or other information identifying the graphical user interface (GUI) element selected, the GUI display presented, and the like. The user input data is timestamped to support sequentially ordering or otherwise reconstructing the user input sequence and/or other temporal analysis of the user input data. In this regard, the user inputs may be integrated or correlated with other operational data captured by an onboard data recorder to provide a more comprehensive and contextual understanding of the operator behavior. For purposes of explanation, the subject matter is primarily described herein in the context of capturing inputs or other actions performed by pilots during operation of an aircraft; however, the subject matter described herein is not necessarily limited to aircraft or avionic environments, and in alternative embodiments, may be implemented in an equivalent manner for operators of other types of vehicles (e.g., automobiles or other ground-based vehicles, vessels or marine-based vehicles, etc.).

Figure 1:
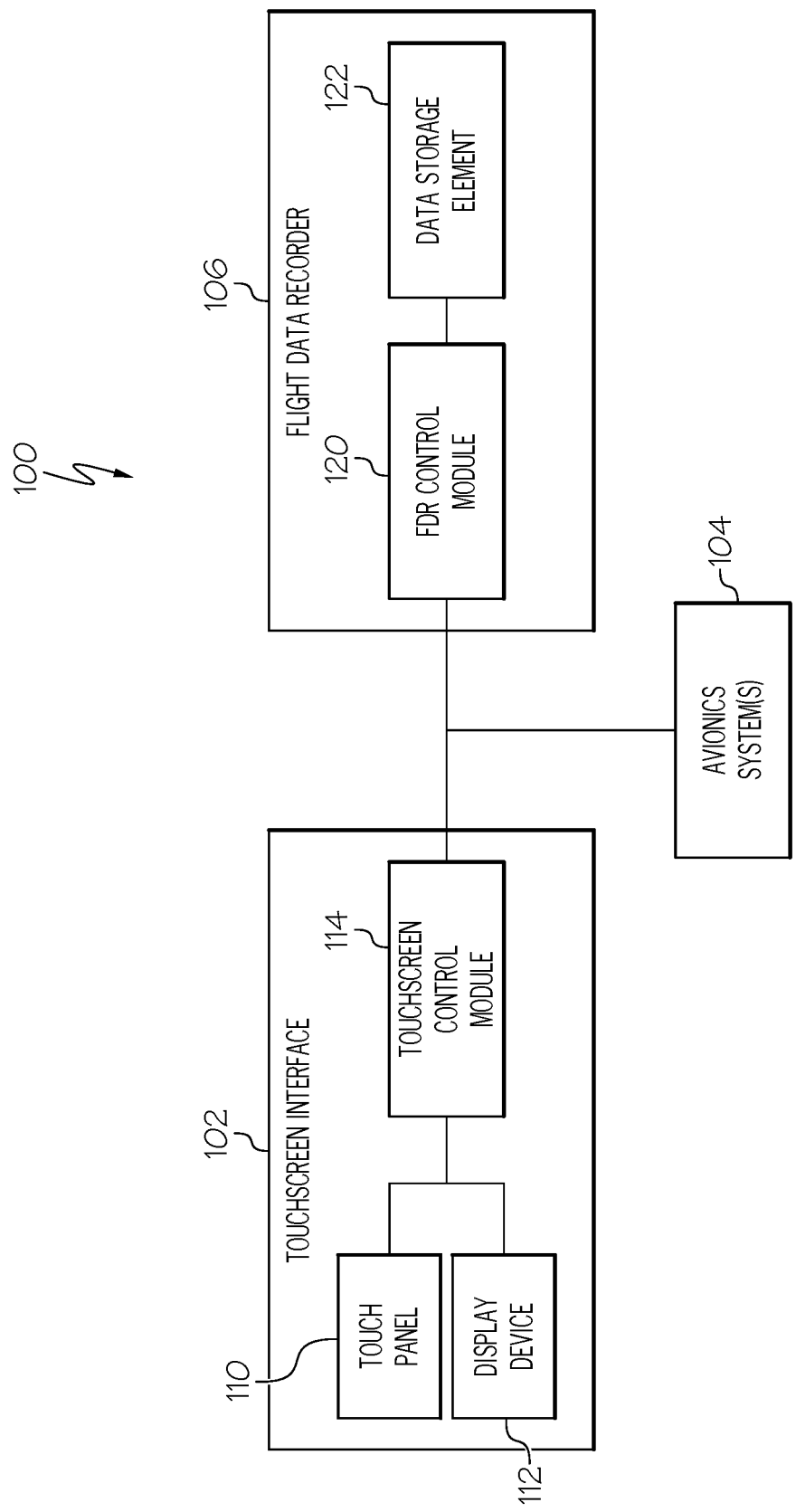
FIG. 1 is a block diagram illustrating a system suitable for use onboard a vehicle such as an aircraft in accordance with one or more exemplary embodiments.

FIG. 1 depicts an exemplary embodiment of a system 100 suitable for use with a vehicle, such as an aircraft. The illustrated vehicle system 100 includes, without limitation, a user interface 102, one or more onboard systems 104, and a data recording system 106 (or data recorder). It should be appreciated that FIG. 1 depicts a simplified representation of a vehicle system 100 for purposes of explanation and is not intended to limit the subject matter in any way. That said, for purposes of explanation, the system 100 is described herein in the context of an aircraft system onboard an aircraft. Accordingly, for purposes of explanation but without limitation, the data recording system 106 may alternatively be referred to herein as a flight data recorder (FDR).

The user interface 102 generally represents the device, component, or combination thereof that are onboard the aircraft and allow the pilot, co-pilot, or other operator to interface or otherwise interact with the onboard systems 102. In exemplary embodiments, the user interface 102 is realized as a touchscreen interface that includes a touch panel 110 or similar tactile user input device that overlies at least a portion of a display device 112. That said, it should be appreciated that the subject matter described herein is not necessarily limited to use with touchscreen or other tactile input devices and may be implemented in an equivalent manner to capture data pertaining to user inputs received from other user interfaces, such as, for example, buttons, keypads, keyboards, mice, joysticks, knobs, line select keys or any other suitable devices adapted to receive input from a user.

The illustrated touchscreen interface 102 also includes a touchscreen control module 114. The touchscreen control module 114 generally represents the hardware, software, and/or firmware components (or a combination thereof) of the touchscreen interface 102 that is communicatively coupled to the touch panel 110 and the display device 112 and configured to support operation of the touchscreen interface 102 and perform additional processes, tasks, operations and/or functions described in greater detail below. Depending on the embodiment, the touchscreen control module 114 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The touchscreen control module 114 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the touchscreen control module 114 may include processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the touchscreen control module 114, or in any practical combination thereof. In this regard, the touchscreen control module 114 may include or otherwise access a data storage element (or memory) capable of storing code or other computer-executable programming instructions that, when read and executed by the touchscreen control module 114, cause the touchscreen control module 114 to support or otherwise perform certain tasks, operations, functions, and/or processes described herein.

In exemplary embodiments, the touchscreen control module 114 receives, from the touch panel 110, data or signals indicative of a user input received at the touch panel 110, and generates GUI displays on the display device 112 responsive to the received user input using operational data received from one or more onboard avionics systems 104 coupled thereto. As described in greater detail below, in exemplary embodiments, the touchscreen control module 114 receives, from the touch panel 110, data or signals indicative of the coordinate location or other spatial characterizations of the position of the user input received on the touch panel 110. Based on the spatial data for the received user input, the touchscreen control module 114 may identify or otherwise determine whether a GUI element presented on the display device 112 is selected or otherwise manipulated, and if so, respond accordingly by adjusting or altering the GUI display and/or communicating with one of more of the onboard avionics systems 104. In exemplary embodiments, the touchscreen control module 114 also outputs or otherwise provides, to the data recording system 106, the spatial input data along with the related metadata (e.g., identification of the GUI display presented, identification of the GUI element selected, values for one or more parameters corresponding to the user input, commands or requests provided to an onboard avionics system 104, and/or the like). A timestamp is generated or otherwise assigned to the user input data by one of the touchscreen control module 114 and the recording system 106 to facilitate storing or otherwise maintaining the user input data in a time ordered sequence for retrospective reconstruction.

The onboard systems 104 generally represent any sort of electrical, mechanical, hydraulic, pneumatic, environmental, or propulsion systems configured to facilitate or otherwise support one or more aspects of operation. For example, in the case of an aircraft, the onboard avionics systems 104 could include or otherwise be realized as any one or more of the following: a flight management system (FMS), a communications system, a navigational system, a weather system, an air traffic management system, a radar system, a traffic avoidance system, an autopilot system, an autothrust system, a landing gear system, a flight control system, hydraulics systems, pneumatics systems, environmental systems, electrical systems, engine systems, trim systems, lighting systems, crew alerting systems, electronic checklist systems, a heads-up display (HUD) or other display system (s), a ground proximity warning system, a yoke stick control system, an electronic flight bag and/or any other avionics system. A given onboard avionics system 104 may support any number of different operating modes or control functions, and/or may operate in accordance with any number of parameters or settings that may be adjusted or configured to influence the operation or functionality of the respective system 104.

Still referring to FIG. 1, in the illustrated embodiment, the FDR 106 is coupled to the onboard avionics systems 104 and configured to store or otherwise maintain data provided by the respective systems 104 during operation of the aircraft in addition to user input data provided by the touchscreen interface 102. For example, the FDR 106 may receive or otherwise obtain real-time flight data and/or information from one or more avionics systems 104 onboard the aircraft reflects the contemporaneous operation of the aircraft, such as, for example, the aircraft position (e.g., the instantaneous latitude, longitude, altitude, heading, and the like), aircraft velocity, aircraft orientation (e.g., roll, pitch, and yaw), the meteorological conditions proximate the aircraft (e.g., the temperature, pressure, winds, and the like outside the aircraft), the current conditions onboard the aircraft (e.g., the cabin pressure, cabin temperature, and the like), the current engine status (e.g., engine cutoff parameters, identification of shutdown and/or inoperable engines), and the like. In the illustrated embodiment, the FDR 106 includes a control module 120 that is coupled to the avionics systems 104 and records or otherwise stores the obtained flight data in a data storage element 122 in a time ordered sequence. In this regard, the FDR control module 120 may timestamp or otherwise tag the obtained flight data with the time at which it was received.

The FDR control module 120 generally represents the hardware, software, and/or firmware component(s) (or a combination thereof) communicatively coupled to the various elements of the aircraft system 100 and configured to support operations of the FDR 106 by performing additional processes, tasks, operations, and/or functions described in greater detail below. Depending on the embodiment, the FDR control module 120 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The FDR control module 120 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the FDR control module 120 may include processing logic that may be configured to carry out the functions, techniques, and processing tasks associated with the operation of the aircraft system 100, as described in greater detail below. Furthermore, the steps of a method or algorithm described in connection with the embodiments disclosed herein may be embodied directly in hardware, in firmware, in a software module executed by the FDR control module 120, or in any practical combination thereof. In this regard, the FDR control module 120 includes or otherwise accesses a data storage element (or memory) storing code or other computer-executable programming instructions that, when read and executed by the FDR control module 120, cause the FDR control module 120 to support or otherwise perform certain tasks, operations, functions, and/or processes described herein.

The data storage element 122 (or memory) generally represents any sort of non-transitory short or long-term storage media that is configured within the FDR 106 to withstand mechanical impacts or other adverse conditions. Depending on the embodiment, the data storage element 122 may include or otherwise be physically realized using solid-state memory, random access memory (RAM), read only memory (ROM), flash memory, registers, a hard disk, or another suitable data storage medium known in the art or any suitable combination thereof. It should be noted that although the subject matter is described herein primarily in the context of an onboard FDR 106 and/or data storage element 122, in practice, data that is or would otherwise be captured by the FDR 106 may be transmitted or otherwise provided to a database or some other remote data storage or device via a communications network.

In exemplary embodiments, the FDR control module 120 timestamps the user input data received from the touchscreen interface 102 and records, stores, or otherwise maintains, for each user input, the timestamp in association with its associated user input data in a time ordered sequence in the data storage element 122. In this regard, in some embodiments, the data storage element 122 may be configured to store data in a first in, first out manner Additionally, the user input data may be integrated with the other flight data received from onboard avionics systems 104 to facilitate an integrated and multidimensional reconstruction of the user input sequence and context, as described in greater detail below.

Figure 2:
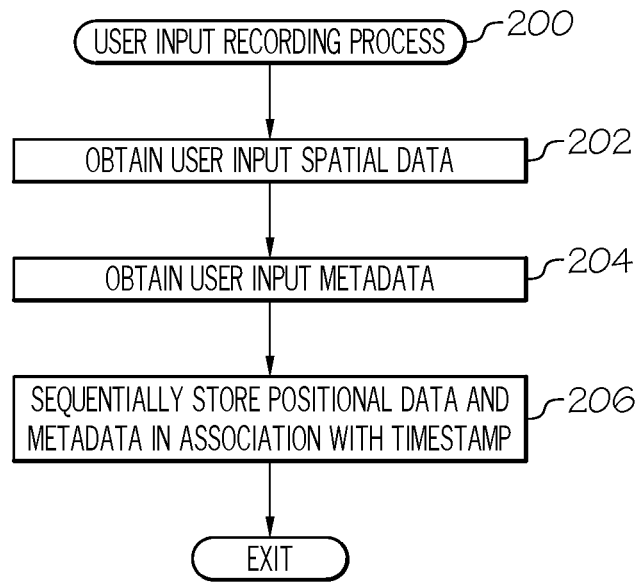
FIG. 2 is a flow diagram illustrating a user input recording process suitable for implementation in the aircraft system of FIG. 1 in accordance with one or more exemplary embodiments.

FIG. 2 depicts an exemplary embodiment of a user input recording process 200 suitable for use in a vehicle system, such as the aircraft system 100 of FIG. 1. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the user input recording process 200 may be performed by different elements of the system 100, such as, for example, the touchscreen interface 102, the touchscreen control module 114, the FDR 106, the FDR control module 120 and/or the data storage element 122. It should be appreciated that the user input recording process 200 may include any number of additional or alternative tasks, the tasks need not be performed in the illustrated order and/or the tasks may be performed concurrently, and/or the user input recording process 200 may be incorporated into a more comprehensive procedure or process having additional functionality not described in detail herein. Moreover, one or more of the tasks shown and described in the context of FIG. 2 could be omitted from a practical embodiment of the user input recording process 200 as long as the intended overall functionality remains intact.

In exemplary embodiments, the user input recording process 200 is performed in response to receiving a user input selecting or otherwise manipulating a GUI element presented on a GUI display. The illustrated user input recording process 200 receives or otherwise obtains spatial data characterizing the position of the user input on the GUI display (task 202). In this regard, in exemplary embodiments, the touchscreen control module 114 receives or otherwise obtains, from the touch panel 110, signals or other data indicative of the coordinate location of a user input on the touch panel 110 and identifies or otherwise determines when the user input corresponds to selection or manipulation of a GUI element, for example, based on the manner in which the user taps, gestures, depresses, or otherwise interacts with the touch panel 110 at a coordinate location co-located with a GUI element. In response to selection or manipulation of a GUI element, the touchscreen control module 114 captures or otherwise maintains the coordinate location of the user input for provision to the FUR 106. Here, it should be noted that the subject matter may be implemented in an equivalent manner for a cursor control device (CCD), a mouse, or other user interface device in lieu of the touchscreen interface 102, where a control module or other processing associated therewith similarly receives signals or other data indicative of the coordinate location of a pointer, cursor, or other symbol corresponding to the location of a user input and identifies selection or manipulation of a GUI element based on the location of user input and the interaction with the user input device.

Additionally, in exemplary embodiments, the user input recording process 200 also identifies or otherwise obtains metadata that characterizes the operational context associated with the user input contemporaneous to receiving the user input (task 204). For example, in exemplary embodiments, the touchscreen control module 114 identifies or otherwise determines the screen, menu, or GUI display currently presented on the display device 112, the GUI element presented thereon that was selected or manipulated, a parameter, variable, or other attribute associated with the selected GUI element, a value corresponding to or otherwise associated with the user input (e.g., when the user input selects or provides a value for a parameter), and the like. Additionally, when the selection of the GUI element results in an actionable event by the touchscreen control module 114, such as generating a command or request for an avionics system 104 and/or the display device 112 (e.g., to update the GUI display presented), the touchscreen control module 114 may also capture or otherwise maintain data characterizing the event(s) generated or triggered by the received user input. Additionally, identification of the input device associated with the user input and/or the type of input device associated with the user input may also be captured (e.g., the touch panel 110, a CCD, a mouse, a keyboard, etc.).

The user input recording process 200 stores or records the captured user input spatial data and the captured user input metadata in association with a timestamp associated with the user input sequentially within a time ordered sequence (task 206). For example, in one embodiment, the touchscreen control module 114 may tag or otherwise timestamp the captured user input data with a value representing the time at which the user input was received, and then provide the timestamped captured user input data to the FDR 106 for persistent storage. In other embodiments, the touchscreen control module 114 provides the captured user input data (e.g., the spatial data and associated metadata) to the FDR control module 120, which, in turn assigns a timestamp to the captured user input data received from the touchscreen interface 102 upon storage to the data storage element 122.

The user input recording process 200 may be repeated throughout operation of an aircraft to capture or otherwise record data characterizing each input received via the touchscreen interface 102 during operation. In exemplary embodiments, the FDR 106 stores or otherwise maintains the captured user input data in a time ordered sequence according to the timestamps associated with the respective user inputs to allow for the actions or behaviors by the pilot, co-pilot, or other operators to be temporally reconstructed in the same order in which the user inputs were received. Additionally, the timestamped captured user input data may be integrated with or otherwise correlated with timestamped flight data to more fully reconstruct the operating context at or around the time of the respective user inputs in the user input sequence, as described in greater detail below.

Figure 3:
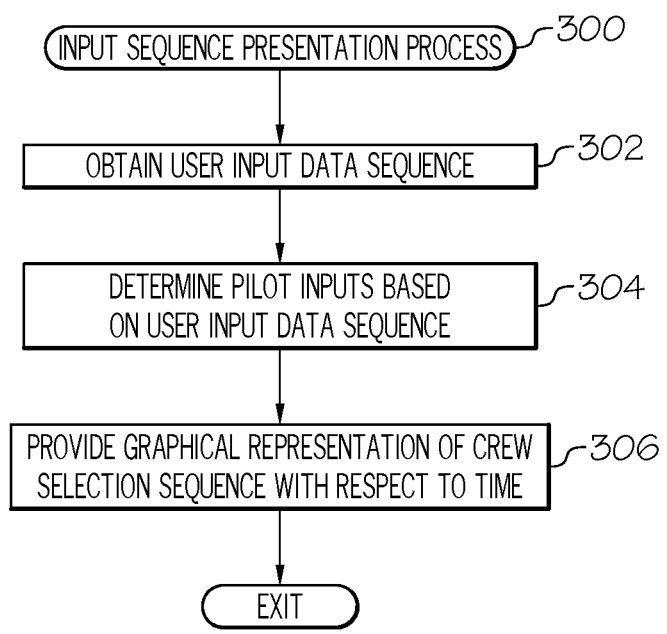
FIG. 3 is a flow diagram illustrating an input sequence presentation process suitable for implementation in connection with the user input recording process of FIG. 2 in accordance with one or more exemplary embodiments.

FIG. 3 depicts an exemplary embodiment of an input sequence presentation process 300 suitable for use in conjunction with the user input recording process of FIG. 2. The various tasks performed in connection with the illustrated process 300 may be implemented using hardware, firmware, software executed by processing circuitry, or any combination thereof. For illustrative purposes, the following description may refer to elements mentioned above in connection with FIG. 1. It should be appreciated that the input sequence presentation process 300 may include any number of additional or alternative tasks, the tasks need not be performed in the illustrated order and/or the tasks may be performed concurrently, and/or the input sequence presentation process 300 may be incorporated into a more comprehensive procedure or process having additional functionality not described in detail herein. Moreover, one or more of the tasks shown and described in the context of FIG. 3 could be omitted from a practical embodiment of the input sequence presentation process 300 as long as the intended overall functionality remains intact.

In exemplary embodiments, the input sequence presentation process 300 is performed by a computing device being utilized to review the contents of the data storage element 122 of the FUR 106. For example, the computing device may include a processing system and a data storage element that stores code or other computer-executable programming instructions that, when read and executed by the processing system, cause the processing system to generate or otherwise provide an application that supports reviewing and analyzing the data obtained from the FDR 106. In this regard, the computing device may include or otherwise be communicatively coupled to a display device that allows the processing system to generate or otherwise provide one or more GUI displays including graphical representations of the captured user input data, as described in greater detail below in the context of FIGS. 7-8.

Still referring to FIG. 3, the input sequence presentation process 300 receives or otherwise obtains the time ordered sequence of captured user input data, identifies or otherwise determines the sequential pilot inputs based on the sequential captured user input data, and generates or otherwise provides a graphical representation of the sequential pilot inputs in a time ordered manner (tasks 302, 304, 306). In this regard, the input sequence presentation process 300 utilizes the coordinate location or other spatial data for the user inputs in conjunction with their corresponding GUI displays and GUI elements to identify or otherwise determine the nature of the pilot's interaction with the user interface. For example, related user inputs for achieving a common pilot objective may be identified or otherwise determined based on the relationships between timestamps and other metadata associated with different user inputs. Within each logical grouping of user inputs, the spatial data and corresponding GUI displays and/or GUI elements may be analyzed to identify or otherwise determine a pilot action or objective represented by the logical grouping of user inputs. In this regard, if a sequence of user inputs are performed to navigate from an initial GUI display (e.g., a home or main menu GUI display) to a specific menu or GUI display for configuring or adjusting a particular parameter or aspect of the aircraft operation, the input sequence presentation process 300 may summarize or otherwise characterize the sequence of user inputs in the context of the ultimate selection or action performed by the pilot. An elapsed time associated with performing the action may also be identified based on the duration of time between the earliest and latest timestamps associated with the logical grouping of user inputs. Thereafter, a graphical representation of the identified pilot action may be provided with an indication of the elapsed time or duration associated with performing the pilot action at a time corresponding to the timestamp of the earliest user input associated with that identified pilot action. As described in greater detail below, in some embodiments, the graphical representation of the identified pilot action may be selectable or otherwise expandable to provide a detailed view of each constituent user input associated therewith and the respective timestamps thereof.

In one or more embodiments, the graphical representations of the captured user inputs are displayed or otherwise presented in conjunction with the flight data obtained from the avionics systems 104. For example, in one or more embodiments, a timeline GUI display may be provided that includes graphical indicia of the captured user inputs at their corresponding times (based on the timestamps associated therewith) along with graphical indicia of various flight data at the corresponding times where the flight data changed or was provided. For example, the timeline may depict captured user inputs temporally relative to changes in flight phases, changes in flight levels, traversing waypoints or other navigational reference points, changes in configuration of an onboard system (e.g., a change in the state of the landing gear system), and/or the like. Thus, the timeline GUI display may be utilized to identify the operational context associated with different user inputs and the temporal relationships between when the user inputs were made and when notable changes to the operational context occurred.

In other embodiments, an integrated multidimensional GUI display may be provided that provides graphical indicia of the captured user inputs with respect to contemporaneous flight data, such as, for example, altitude, distance, and/or the like. For example, as described in greater detail below in the context of FIG. 8, in one embodiment, graphical indicia of captured user inputs may be presented with respect to the distance-to-go from the destination at the time of the respective captured user inputs, thereby concurrently enabling both temporal and spatial analysis of the user input sequence.

Figure 4:
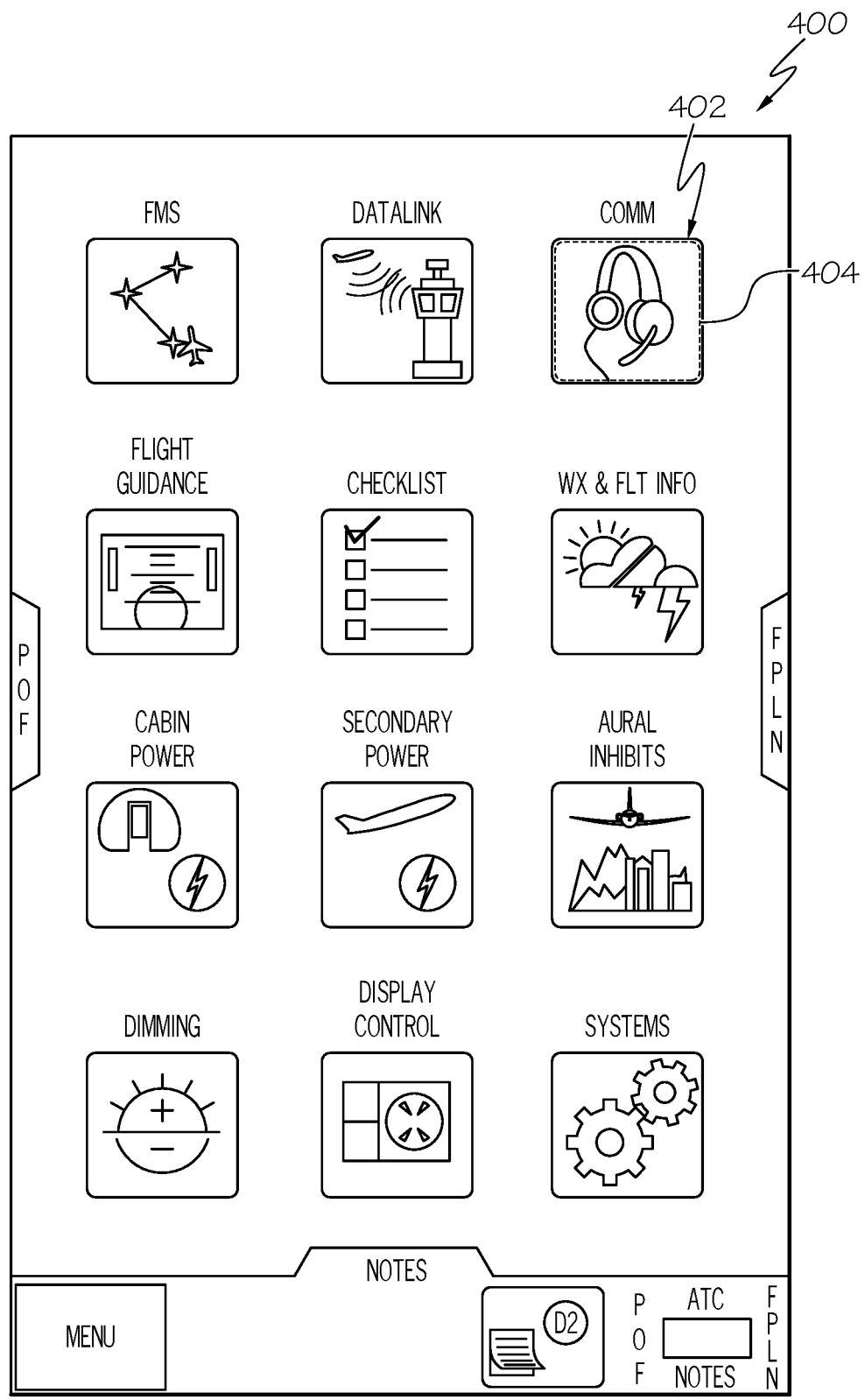
FIGS. 4-6 depict an exemplary sequence of graphical user interface (GUI) displays that may be presented on a display device onboard an aircraft in connection with an exemplary embodiment of the user input recording process of FIG. 2.
Figure 5:
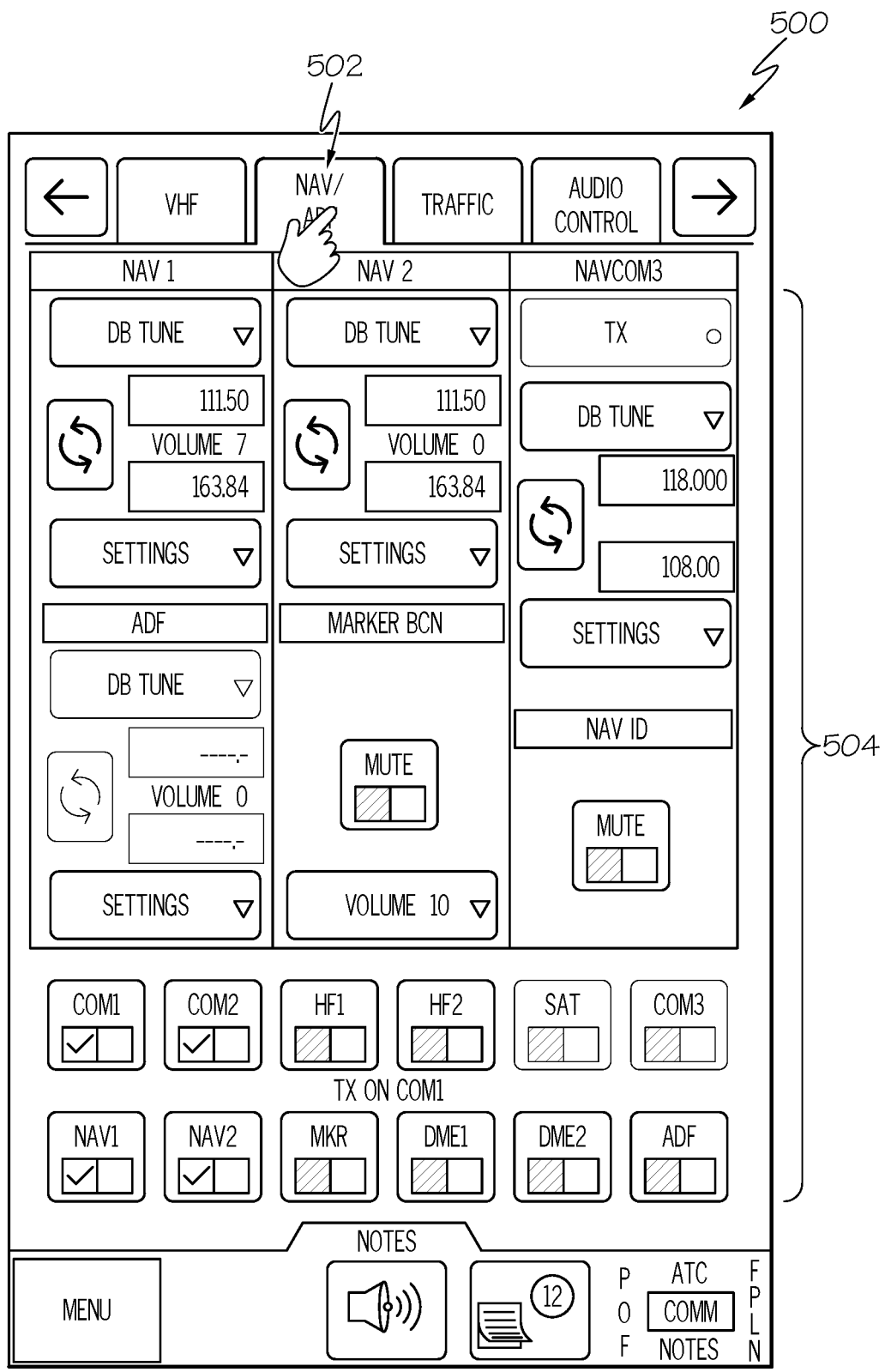
Figure 6:
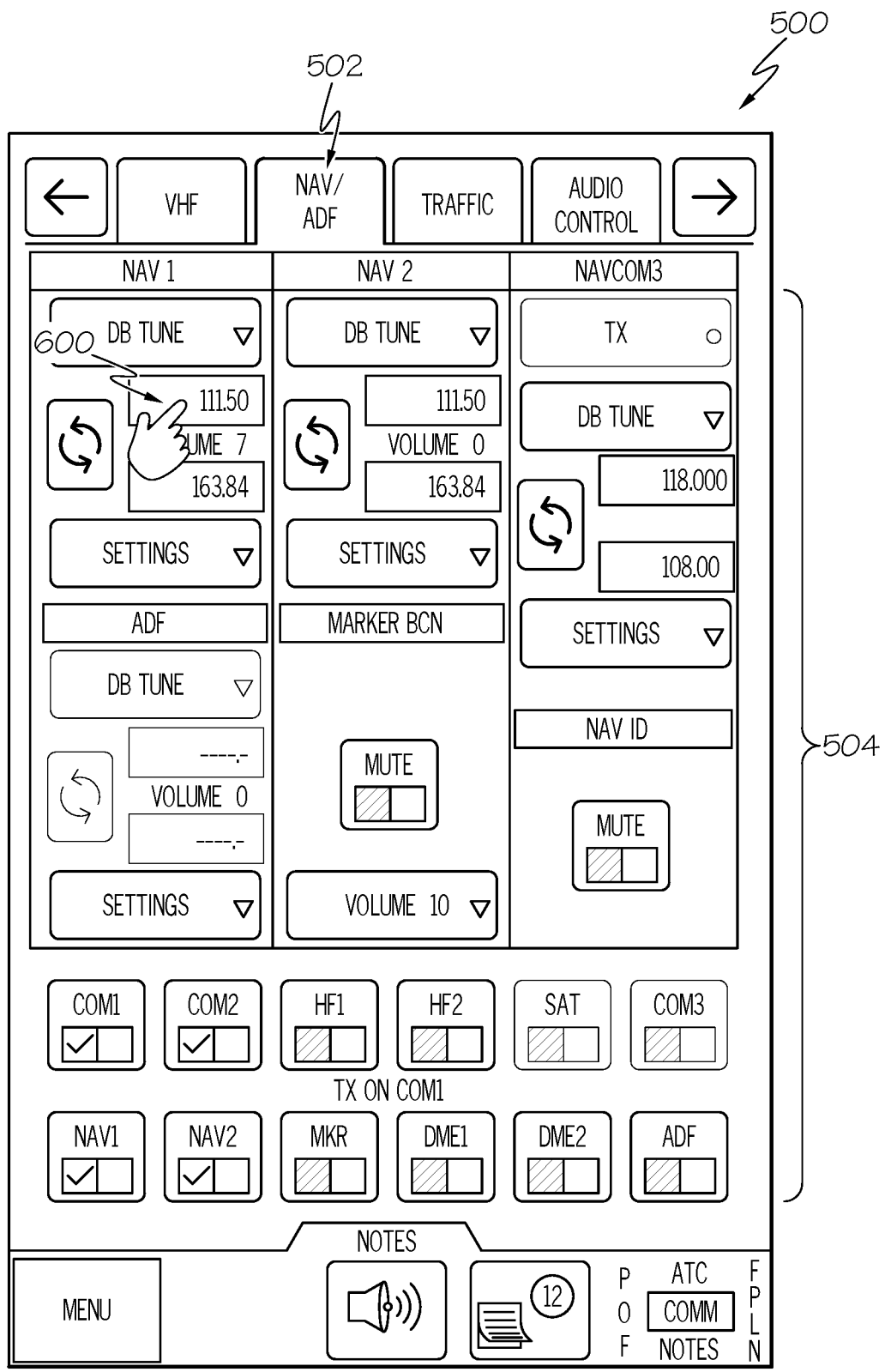

FIGS. 4-6 depict an exemplary sequence of GUI displays and corresponding to a sequence of pilot inputs suitable for use in connection with the user input recording process 200 of FIG. 2 and the input sequence presentation process 300 of FIG. 3 described above. In this regard, FIGS. 4-6 depict a sequence of pilot inputs for navigating through a corresponding sequence of GUI displays to select a radio frequency associated with a radio-based navigational aid for use by a navigation system onboard the aircraft.

Referring first to FIG. 4, a pilot may initially select a button 402 or similar selectable GUI element on a main menu GUI display 400 by providing a corresponding selection input within a region 404 on the display device 112 that is co-located with or otherwise overlies the button 402. For example, the pilot may tap or otherwise touch the surface of the touchscreen interface 102 and/or touch panel 110 at a position within the region 404 aligned with the communications menu button 402 to activate, actuate, or otherwise select the communications menu button 402, and thereby initiate presentation of a communications GUI display 500 on the display device 112. In non-touchscreen embodiments, a pointer, cursor, or other symbology may be aligned with the button 402 (e.g., using a CCD, mouse or similar interface device) before the pilot provides an input that actuates or otherwise selects the button 402.

As described above, in response to receiving or otherwise identifying the user input, the touchscreen control module 114 captures or otherwise maintains the coordinate location defining the position where the user input was received with respect to the touch panel 110, the display device 112, and/or the GUI display 400. Additionally, the touchscreen control module 114 captures or otherwise maintains other metadata characterizing the user input, such as, for example, identification of the touch panel 110 as the user interface device where the user input was provided, identification of the main menu GUI display 400 as being currently presented, identification of the communications menu button 402 as being selected, the resulting commands or requests provided by the touchscreen control module 114 to the display device 112 to update the presentation to a communications GUI display, the resulting commands or requests for information provided by the touchscreen control module 114 any onboard avionics systems 104 (e.g., the communications system, the navigation system, and/or the like) in connection with updating the presentation to a communications GUI display, and/or the like. The coordinate location of the user input and the associated contemporaneous metadata are timestamped or otherwise associated with one another temporally and provided to the FDR 106 for storage in the data storage element 122, which may be performed concurrently to updating the GUI display at the display device 112.

Referring now to FIG. 5, after selection of the communications menu button 402, the touchscreen control module 114 may request information from one or more onboard systems 104 pertaining to the various communications channels currently programmed, selected, or otherwise configured for use by the aircraft. Thereafter, the touchscreen control module 114 utilizes the retrieved communications information to generate the communications GUI display 500 that includes GUI elements for modifying or otherwise configuring various aspects of communications with respect to one or more onboard systems 104. FIG. 5 depicts a scenario where the pilot may tap or otherwise touch the surface of the touchscreen interface 102 and/or touch panel 110 at a position aligned with the navigation tab 502 to cause a navigation GUI display 504 to be presented. In response to selection of the navigation tab 502, the touchscreen control module 114 identifies or otherwise obtains the current navigation frequencies and other settings or configurations being utilized by the onboard navigation system(s) 104 and commands or otherwise instructs the display device 112 to provide the navigation GUI display 504 that is populated with GUI elements indicating the current configuration of the navigation system(s) 104.

As described above, the touchscreen control module 114 captures or otherwise maintains the coordinate location defining the position where the user input was received overlying the navigation tab 502 along with other metadata characterizing the user input, such as, for example, identification of the touch panel 110 as the user interface device where the user input was provided, identification of the communications GUI display 500 as being currently presented, identification of the navigation tab 502 as being selected, the resulting commands or requests provided by the touchscreen control module 114 to the display device 112 to present the navigation GUI display 504, the resulting commands or requests for information provided to the onboard navigation system(s) 104 for populating the navigation GUI display 504, and/or the like. Again, the coordinate location of the user input and the associated contemporaneous metadata are timestamped or otherwise associated with one another temporally and provided to the FDR 106 for storage in the data storage element 122 in a time ordered sequence after the data pertaining to the preceding user input.

Referring to FIG. 6, the pilot may subsequently select a GUI element 600 presented within the navigation GUI display 504 to activate or otherwise enable use of the radio frequency configured on the first navigation radio (NAV1). The touchscreen control module 114 captures or otherwise maintains the coordinate location defining the position where the user input was received overlying the NAV1 frequency GUI element 600 along with other metadata characterizing the user input, such as, for example, the resulting commands provided by the touchscreen control module 114 to an onboard navigation system 104 to activate or otherwise enable the first navigation radio, the value for the frequency indicated by the NAV1 frequency GUI element 600, and the like. The captured user input data is provided to the FDR 106 and stored in the data storage element 122 in the time ordered sequence after the captured user input data for the preceding pilot input.

Figure 7:
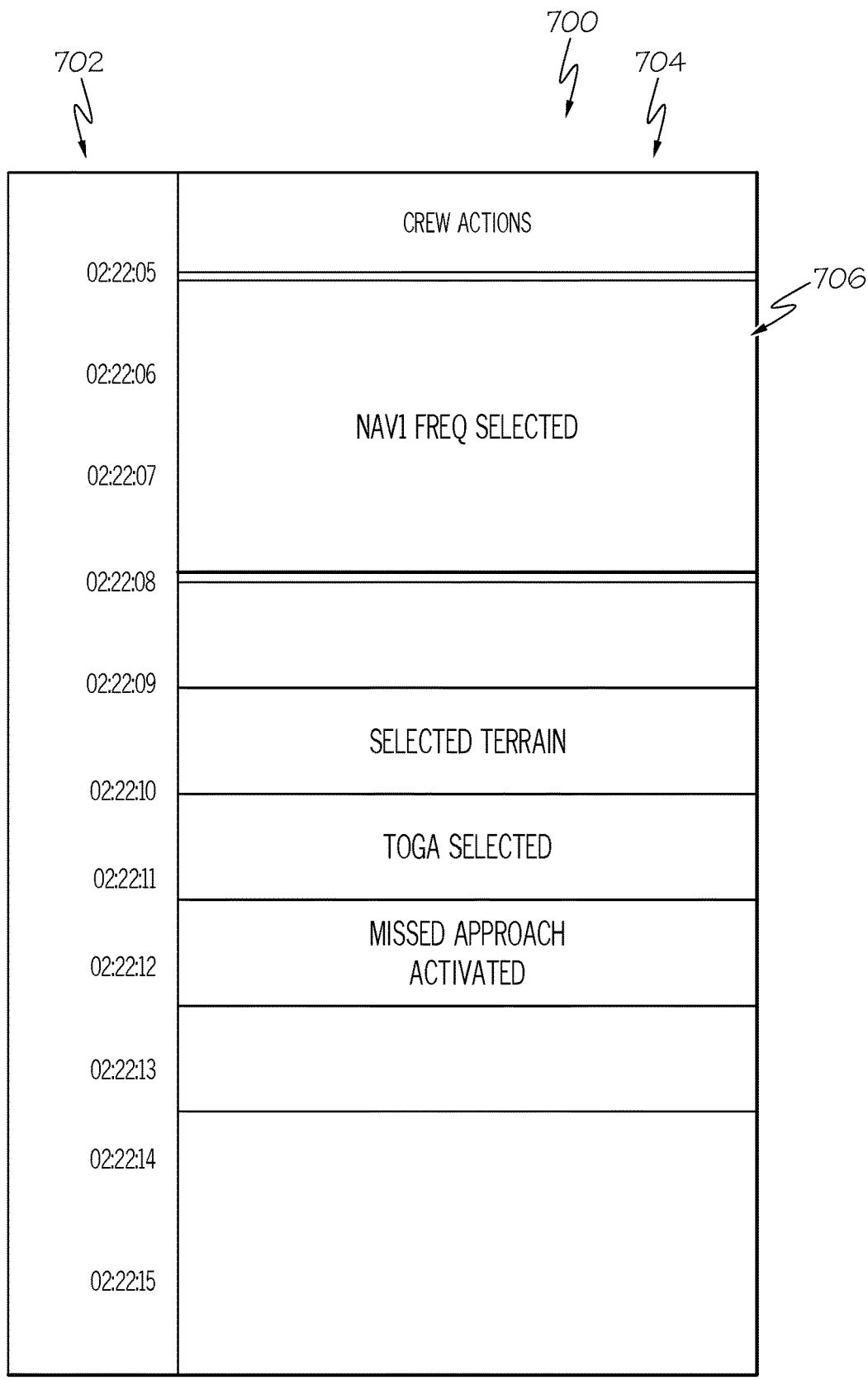
FIG. 7 depicts a timeline GUI display suitable for graphically representing a sequence of user inputs in accordance with the user input recording process of FIG. 2 and the input sequence presentation process of FIG. 3 in accordance with one embodiment.

FIG. 7 depicts a timeline GUI display 700 that may be presented by or on a computing device in connection with the input sequence presentation process 300 of FIG. 3. The timeline GUI display 700 includes a time column 702 that indicates the time associated with graphical indicia depicted in an adjacent column 704 of the timeline GUI display 700 for depicting actions by pilot or other crew members. In exemplary embodiments, the timeline GUI display 700 is capable of being scrolled or panned vertically to go forward or backwards in time, while maintaining the synchronous relationship between the columns 702, 704.

As described above in connection with the input sequence presentation process 300, based on the sequential ordering, the temporal relationship, and/or potentially other factors, the sequence of captured inputs corresponding to the sequence of FIGS. 4-6 may be identified as being logically related to one another. Analysis of the captured user input sequence may identify that the pilot or objective was to select the frequency programmed into the first navigation radio for use, and a corresponding graphical indication 706 indicating selection of the first navigation radio frequency at the corresponding temporal location on the timeline GUI display 700, that is, within the crew action column 704 horizontally aligned with the appropriate time indicator within the time column 702. In the illustrated embodiment, the graphical indication 706 for the selection of the first navigation radio has a vertical dimension with respect to the time indicia in the time column 702 that corresponds to the elapsed duration of time during which the pilot was performing the input sequence of FIGS. 4-6, that is, the graphical indication 706 may extend from a time value for the timestamp associated with the initial input selecting the communications menu button 402 on the main menu GUI display 400 to a time value for the timestamp associated with the final input selecting the NAV1 frequency button 600. That said, in other embodiments, the graphical indicia 706 may be presented at any one of the timestamps associated with the captured user inputs or an average thereof (e.g., the midpoint in time).

It should be noted that while FIG. 7 depicts a timeline GUI display 700 where the logically related user inputs are condensed into a single graphical indication 706, in some embodiments, the graphical indication 706 may be selectable or expandable to further provide graphical indicia of the underlying constituent pilot inputs from which the summarized graphical indication 706 is derived. For example, in response to selection of the graphical indication 706, the timeline GUI display 700 may be updated to display, in lieu of the condensed graphical representation 706, graphical indicia for each user input of the logically related sequence (e.g., COMM MENU SELECTED, followed by NAV TAB SELECTED, followed by NAV1 FREQ SELECTED) in a time ordered manner at the locations with respect to the time column 702 that correspond to their respective timestamps. Furthermore, it should be noted that in other embodiments, the column 704 may not be limited to actions performed by a pilot or other crew members and may further include graphical representations or indicia for other flight data captured by the FDR 106 at corresponding times with respect to the time column 702. For example, if the pilot selected the NAV1 radio in response to a change in the flight phase, the timeline GUI display 700 may indicate that flight phase change at a location with respect to the time column 702 that precedes the graphical indication 706, thereby enabling a retrospective analysis to conclude whether there was a causal relationship between the pilot actions and the change in flight phase (or potentially other changes during flight).

It should be noted that although FIG. 7 depicts a timeline GUI display 700 configured so that time advances moving downward, that is, as the timeline GUI display 700 is scrolled down, in other embodiments, the timeline GUI display 700 may be configured to that time advances moving upward (e.g., as the timeline GUI display 700 is scrolled upwards). Additionally, in other embodiments, the timeline GUI display 700 may be configured to move through time laterally along a horizontal axis as opposed to vertically. Accordingly, the subject matter described herein is not intended to be limited to any particular orientation or configuration for presenting time or other temporal relationships on a timeline GUI display.

Figure 8:
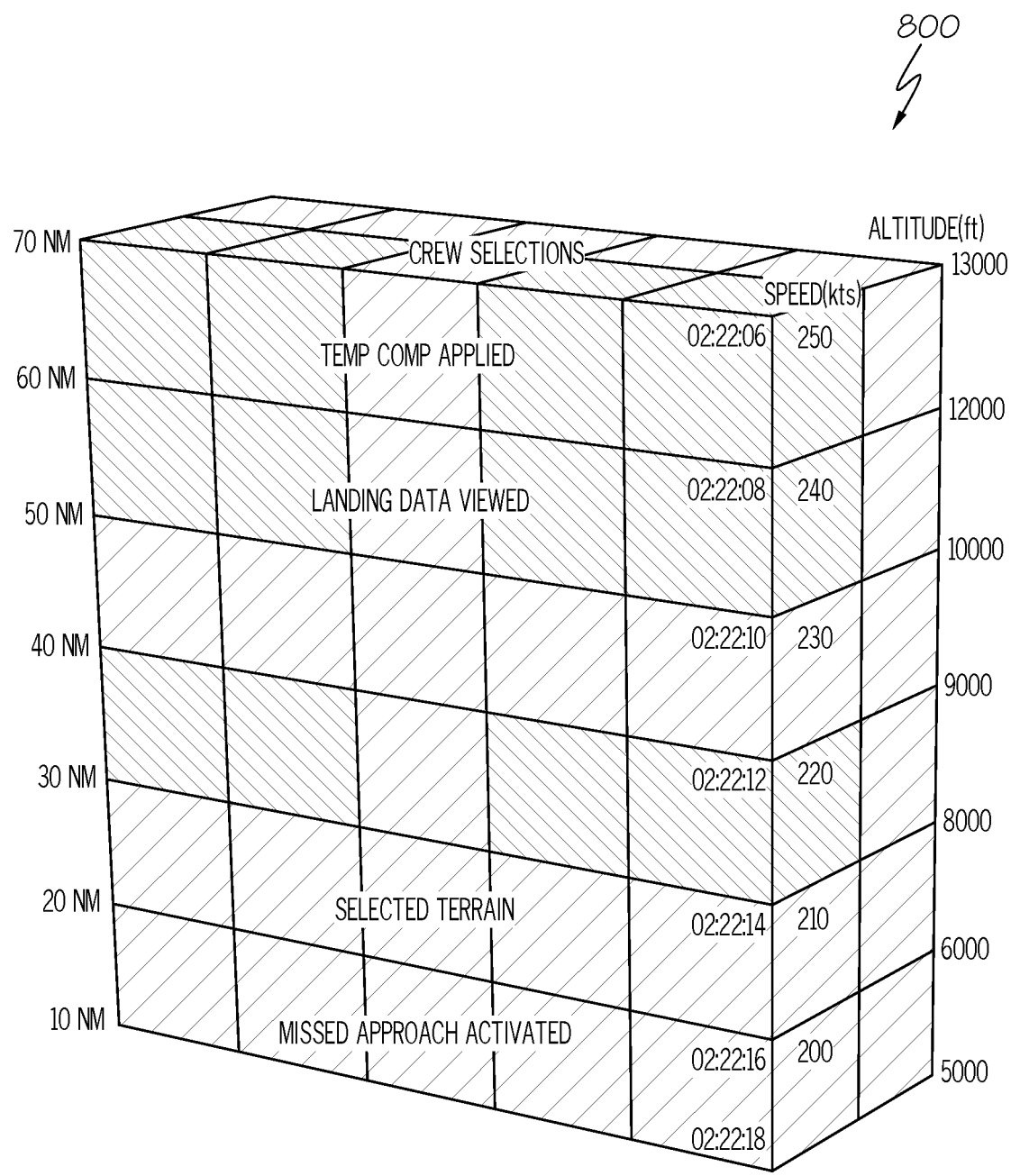
FIG. 8 depicts an integrated GUI display suitable for graphically representing a sequence of user inputs with respect to contemporaneous flight data in accordance with the user input recording process of FIG. 2 and the input sequence presentation process of FIG. 3 in accordance with one embodiment.

FIG. 8 depicts an integrated GUI display 800 that may be presented by or on a computing device in connection with the input sequence presentation process 300 of FIG. 3. In this regard, the timestamp associated with captured user inputs may be utilized to temporally associate the captured user inputs with contemporaneously captured flight data, which, in turn may be utilized to depict the user inputs with respect to one another on the integrated GUI display 800. Each captured user input may be presented on the integrated GUI display 800 with respect to one or more of the contemporaneous speed, altitude, distance-to-go, and/or potentially other operational parameters temporally associated with that captured user input concurrently to presenting the captured user input, for example, by utilizing different axes associated with different flight-related variables. For example, an integrated three-dimensional GUI display may associate the x-axis with the time or distance-to-go, the y-axis with the altitude, and the z-axis with the speed (or velocity) of the aircraft, with the graphical indication for a captured user input being positioned at a three-dimensional coordinate location that corresponds to the contemporaneous altitude, speed, and distance-to-go at the time that captured user input was received. Thus, a retrospective analysis may concurrently assess the sequence of captured user inputs in relation to the overall operation of the aircraft to better identify causal or otherwise significant relationships between pilot actions and various aspects of the aircraft operation.

By virtue of the subject matter described herein, a more in-depth retrospective analysis of pilot or other operator inputs may be performed to identify causal relationships between operator behavior and vehicle outcomes. In this regard, the captured user input data allows for the sequence of pilot actions to be derived and correlated to other captured flight data to allow an investigative authority to more accurately reconstruct the operating scenario. This may be particularly advantageous and facilitate identifying situations where one or more onboard systems or components do not respond to a pilot input in the anticipated or intended manner.

Exemplary scenarios where the subject matter may be beneficial in identifying causality will now be described. In one exemplary scenario, when flying under low visibility, the pilot does not turn on the terrain layer on the display system and take-off/go-around (TOGA) is selected at an altitude that is below the elevation of the terrain, the absence of captured user inputs for turning on the terrain layer may allow for retrospective analysis to conclude that the pilot did not to plan the approach properly due to failure to turn on the terrain layer. In another exemplary scenario where the aircraft is flown at the incorrect altitude, the captured user inputs may be analyzed to identify whether the altitude error was due to the absence of the pilot performing barometric correction or temperature compensation on a waypoint.

In another scenario, the captured user inputs may be utilized to determine whether or not the pilot or other crew members have performed all the required elements presented on a checklist GUI display. For example, the captured user inputs made on the checklist GUI display can be analyzed to identify when the pilot or crew has not executed the entirety of the required emergency checklist, and furthermore, the missing actions. Alternatively, if all items on the checklist were executed or otherwise marked complete by a crew member, but an onboard system did not appropriately respond, that onboard system may retrospectively identified as the source of the problem. As another example, the captured user input data may be utilized to identify repeated pilot errors (e.g., continually tuning to the wrong frequency).

For the sake of brevity, conventional techniques related to data recorders, accident reconstruction, touchscreens or other tactile input devices, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, terms such as "first," "second," and other such numerical terms may be utilized to refer to or distinguish between different elements or structures without implying a sequence or order unless indicated by the context.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. An aircraft system comprising:
a user interface comprising a user input device to receive a plurality of user inputs and a control module coupled to the user input device to capture data associated with each of the plurality of user inputs and output the data, wherein the data includes, for each user input of the plurality of user inputs, a respective coordinate location defining a position of the respective user input with respect to a display device and identification of a respective graphical user interface display presented on the display device contemporaneous to the respective user input; and
a flight data recorder coupled to the user interface to receive the data associated with the plurality of user inputs and persistently store, in a data storage element of the flight data recorder, the data associated with the user input device in a time ordered sequence for temporal reconstruction of the plurality of user inputs in the same order in which the plurality of user inputs were received, wherein the time ordered sequence comprises, for each user input of the plurality of user inputs, a respective association between the respective coordinate location of the respective user input, the respective graphical user interface display presented on the display device contemporaneous to the respective user input, and a respective timestamp assigned to the respective user input.

2. The aircraft system of claim 1, wherein:
the user input device comprises a touchscreen;
the plurality of user inputs comprise a plurality of tactile user inputs; and
the respective coordinate location comprises a respective coordinate location of a respective tactile user input of the plurality of tactile user inputs on the touchscreen.

3. The aircraft system of claim 1, wherein the respective coordinate location comprises the respective coordinate location of a pointer or a cursor on the display device.

4. The aircraft system of claim 1, wherein:
the user interface includes a display device having a checklist graphical user interface (GUI) display presented thereon; and
the data identifies user selections within the checklist GUI display.

5. The method of claim 1, further comprising:
capturing, by the data recording system, flight data from an avionics system; and providing a timeline graphical user interface (GUI) display comprising first graphical indicia of the plurality of user inputs at their corresponding times with second graphical indicia at corresponding times where the flight data changed.

6. The method of claim 1, further comprising:
capturing, by the data recording system, flight data from an avionics system; and
providing a timeline graphical user interface (GUI) display depicting the plurality of user inputs temporally relative to changes in the flight data.

7. The method of claim 1, further comprising:
capturing, by the data recording system, flight data from an avionics system; and
providing a graphical user interface (GUI) display comprising first graphical indicia of the plurality of user inputs at their corresponding times with second graphical indicia of the flight data, wherein each respective user input is presented on the GUI display with respect to at least one of a contemporaneous speed, an altitude, and a distance-to-go temporally associated with the respective user input concurrently to presenting the respective user input.

8. A method of capturing user input data pertaining to operation of a vehicle for persistent storage, the method comprising:
capturing, by a data recording system onboard the vehicle, user input spatial data associated with a plurality of user inputs on a display device, wherein for each user input of the plurality of user inputs, the user input spatial data associated with the respective user input includes a coordinate location defining a position where the respective user input was received with respect to the display device;
capturing, by the data recording system, user input metadata associated with the plurality of user inputs, wherein for each user input of the plurality of user inputs, the user input metadata associated with the respective user input identifies a graphical user interface display presented on the display device contemporaneous to the respective user input; and
for each user input of the plurality of user inputs, maintaining, by the data recording system, an association between the user input spatial data associated with the respective user input, the user input metadata associated with the respective user input, and a respective timestamp assigned to the association in a data storage element in a time ordered sequence to allow temporal reconstruction of the plurality of user inputs in the same order in which the plurality of user inputs were received.

9. The method of claim 8, further comprising:
obtaining, by a control module coupled to a user input device associated with the respective user input of the plurality of user inputs, the user input spatial data from the user input device; and
identifying, by the control module coupled to the display device, the user input metadata characterizing a state of the display device contemporaneous to the respective user input of the plurality of user inputs, wherein the control module is coupled to the data recording system to provide the user input spatial data and the user input metadata to the data recording system.

10. The method of claim 9, further comprising identifying, by the control module, the respective timestamp corresponding to the respective user input of the plurality of user inputs.

11. The method of claim 9, wherein identifying the state of the display device comprises identifying a graphical user interface element selected by the user input.

12. The method of claim 9, further comprising identifying, by the control module, a type of input device associated with the user input device, wherein the user input metadata comprises identification of the type of input device associated with the respective user input.

13. The method of claim 8, wherein for one or more of the plurality of user inputs, the user input metadata includes indication of a graphical user interface (GUI) element presented on the display device that was selected by the respective user input of the one or more of the plurality of user inputs.

14. The method of claim 8, wherein for one or more of the plurality of user inputs, the user input metadata includes a numerical value associated with the respective user input of the one or more of the plurality of user inputs.

15. The method of claim 8, wherein for one or more of the plurality of user inputs, the user input metadata includes an attribute associated with a graphical user interface element selected by the respective user input of the one or more of the plurality of user inputs.

16. The method of claim 8, wherein for one or more of the plurality of user inputs, the user input metadata characterizes an actionable event resulting from selection of a graphical user interface element by the respective user input of the one or more of the plurality of user inputs.

17. The method of claim 16, wherein the actionable event comprises a command or request generated for an avionics system.

18. An aircraft system comprising:
a touchscreen interface comprising a display device, a touch panel to receive a plurality of tactile user inputs, and a control module coupled to the touch panel and the display device to capture data associated with the plurality of tactile user inputs, wherein for each tactile user input of the plurality of tactile user inputs, the data includes a respective coordinate location defining a position where the respective tactile user input was received on the touch panel and identification of a respective graphical user interface display presented on the display device contemporaneous to the respective tactile user input; and
a flight data recorder coupled to the touchscreen interface and including a data storage element to persistently store the data associated with the plurality of tactile user inputs received from the touchscreen interface in a time ordered sequence to allow temporal reconstruction of the plurality of tactile user inputs in the same order in which the plurality of tactile user inputs were received, wherein the time ordered sequence comprises, for each tactile user input of the plurality of tactile user inputs, a respective association between the respective coordinate location of the respective tactile user input, the respective graphical user interface display presented on the display device contemporaneous to the respective tactile user input, and a respective timestamp assigned to the respective tactile user input.

19. The aircraft system of claim 18, wherein the data further comprises, for each tactile user input of the plurality of tactile user inputs, an identification of a respective graphical user interface element presented on the display device at the respective coordinate location where the respective tactile user input was received.

* * * * *